(12) United States Patent
Jin et al.

(10) Patent No.: US 12,278,396 B2
(45) Date of Patent: Apr. 15, 2025

(54) BATTERY MODULE, BATTERY PACK COMPRISING BATTERY MODULE, AND VEHICLE

(71) Applicant: LG Energy Solution, Ltd., Seoul (KR)

(72) Inventors: Hee-Jun Jin, Daejeon (KR); Jeong-O Mun, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 575 days.

(21) Appl. No.: 17/774,366

(22) PCT Filed: Jan. 13, 2021

(86) PCT No.: PCT/KR2021/000505
§ 371 (c)(1),
(2) Date: May 4, 2022

(87) PCT Pub. No.: WO2021/162250
PCT Pub. Date: Aug. 19, 2021

(65) Prior Publication Data
US 2022/0367994 A1    Nov. 17, 2022

(30) Foreign Application Priority Data
Feb. 13, 2020   (KR) .................. 10-2020-0017876

(51) Int. Cl.
*H01M 50/507*    (2021.01)
*H01M 10/48*    (2006.01)
(Continued)

(52) U.S. Cl.
CPC ....... *H01M 50/507* (2021.01); *H01M 10/482* (2013.01); *H01M 50/211* (2021.01);
(Continued)

(58) Field of Classification Search
None
See application file for complete search history.

(56) References Cited

U.S. PATENT DOCUMENTS

| 2003/0108789 A1 | 6/2003 | Yamakawa et al. |
| 2015/0147613 A1 | 5/2015 | Hayashida et al. |
| (Continued) | | |

FOREIGN PATENT DOCUMENTS

| EP | 2894695 A2 | 7/2015 |
| JP | 2008166008 A | 7/2008 |
| (Continued) | | |

OTHER PUBLICATIONS

Extended European Search Report including Written Opinion for Application No. 21753664.8 dated Jan. 18, 2024, pp. 1-6.
(Continued)

*Primary Examiner* — Gregg Cantelmo
(74) *Attorney, Agent, or Firm* — Lerner David LLP

(57) ABSTRACT

A battery module includes battery cells, a module case configured to accommodate the battery cells, and a bus bar assembly electrically connected to electrode leads of the battery cells. The bus bar assembly includes a bus bar frame disposed on at least one side of the battery cells, lead slots provided so that electrode leads of the battery cells pass therethrough, sensing bus bars connected to the electrode leads of the battery cells, and short-circuit prevention members configured to surround at least one end of the sensing bus bars.

10 Claims, 8 Drawing Sheets

(51) Int. Cl.
*H01M 50/211* (2021.01)
*H01M 50/24* (2021.01)
*H01M 50/502* (2021.01)
*H01M 50/503* (2021.01)
*H01M 50/569* (2021.01)
*H01M 50/572* (2021.01)
*H01M 50/593* (2021.01)

(52) U.S. Cl.
CPC ......... *H01M 50/24* (2021.01); *H01M 50/502* (2021.01); *H01M 50/503* (2021.01); *H01M 50/569* (2021.01); *H01M 50/572* (2021.01); *H01M 50/593* (2021.01); *H01M 2200/00* (2013.01); *H01M 2220/20* (2013.01)

(56) References Cited

U.S. PATENT DOCUMENTS

| | | | |
|---|---|---|---|
| 2016/0064718 | A1 | 3/2016 | Imai et al. |
| 2016/0248070 | A1* | 8/2016 | Ahn .................. H01M 50/209 |
| 2018/0212223 | A1 | 7/2018 | Zhao |
| 2018/0229621 | A1 | 8/2018 | Roh et al. |
| 2018/0309113 | A1 | 10/2018 | Nakayama et al. |
| 2020/0144580 | A1 | 5/2020 | Hong et al. |

FOREIGN PATENT DOCUMENTS

| | | |
|---|---|---|
| JP | 2010272458 A | 12/2010 |
| JP | 2016081761 A | 5/2016 |
| KR | 20090116976 A | 11/2009 |
| KR | 20130110943 A | 10/2013 |
| KR | 20140077811 A | 6/2014 |
| KR | 20150052755 A | 5/2015 |
| KR | 20160104927 A | 9/2016 |
| KR | 20170034560 A | 3/2017 |
| KR | 20170098579 A | 8/2017 |
| KR | 20190071454 A | 6/2019 |
| KR | 102041494 B1 | 11/2019 |
| WO | 2013179798 A1 | 12/2013 |
| WO | 2014-189023 A1 | 11/2014 |
| WO | WO-2015065078 A1 * | 5/2015 .......... H01M 10/482 |

OTHER PUBLICATIONS

International Search Report for Application No. PCT/KR2021/000505 mailed Apr. 26, 2021, pp. 1-3.

* cited by examiner

BATTERY MODULE, BATTERY PACK COMPRISING BATTERY MODULE, AND VEHICLE

CROSS REFERENCE TO RELATED APPLICATIONS

The present application is a national phase entry under 35 U.S.C. § 371 of International Application PCT/KR2021/000505 filed on Jan. 13, 2021 published in Korean which claims priority to Korean Patent Application No. 10-2020-0017876 filed on Feb. 13, 2020 in the Republic of Korea, the disclosures of which are incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may vary according to the required output voltage or the required charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

If the conventional battery module is exposed to environmental changes such as temperature changes, dew condensation may occur inside the battery module. Water generated by the dew condensation phenomenon may be filled to a predetermined height inside the battery module. In addition, there is a risk that a short circuit may occur between sensing bus bars inside the battery module due to the water generated by dew condensation.

Therefore, it is required to find a way to prevent the sensing bus bars from being short-circuited when dew condensation occurs inside the battery module.

DISCLOSURE

Technical Problem

Therefore, the present disclosure is directed to providing a battery module, which may prevent sensing bus bars from being short-circuited when dew condensation occurs in the battery module, and a battery pack and a vehicle including the battery module.

Technical Solution

In one aspect of the present disclosure, there is provided a battery module, comprising: a plurality of battery cells; a module case configured to accommodate the plurality of battery cells; and a bus bar assembly provided inside the module case and electrically connected to electrode leads of the plurality of battery cells, wherein the bus bar assembly includes: a bus bar frame disposed to at least one side of the plurality of battery cells; a plurality of lead slots provided in the bus bar frame so that electrode leads of the plurality of battery cells pass therethrough; a plurality of sensing bus bars disposed to face the plurality of lead slots and connected to the electrode leads of the plurality of battery cells; and a plurality of short-circuit prevention members mounted to at least one end of the plurality of sensing bus bars and configured to surround the at least one end of the plurality of sensing bus bars.

The plurality of short-circuit prevention members may be mounted to lower ends of the plurality of sensing bus bars.

The plurality of short-circuit prevention members may have a short-circuit prevention groove formed to accommodate the lower end of each sensing bus bar.

The short-circuit prevention groove may have a shape corresponding to the lower end of each sensing bus bar.

The short-circuit prevention groove may have an opening formed at an upper end thereof so that the lower end of each sensing bus bar is inserted therein.

The plurality of short-circuit prevention members may be insulation-coated to surround the lower end of each sensing bus bar.

The plurality of short-circuit prevention members may have an insulating material.

The plurality of short-circuit prevention members may be made of a rubber material.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as above, it is possible to provide a battery module, which may prevent sensing bus bars from being short-circuited when dew condensation occurs in the battery module, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
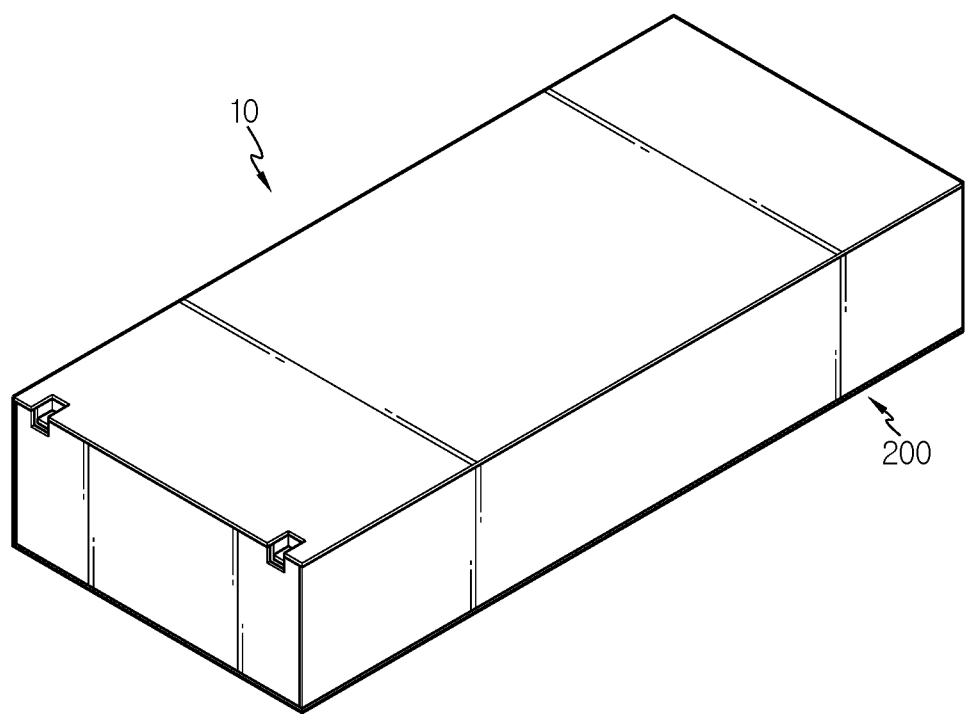
FIG. 1 is a diagram for illustrating a battery module according to an embodiment of the present disclosure.
Figure 2:
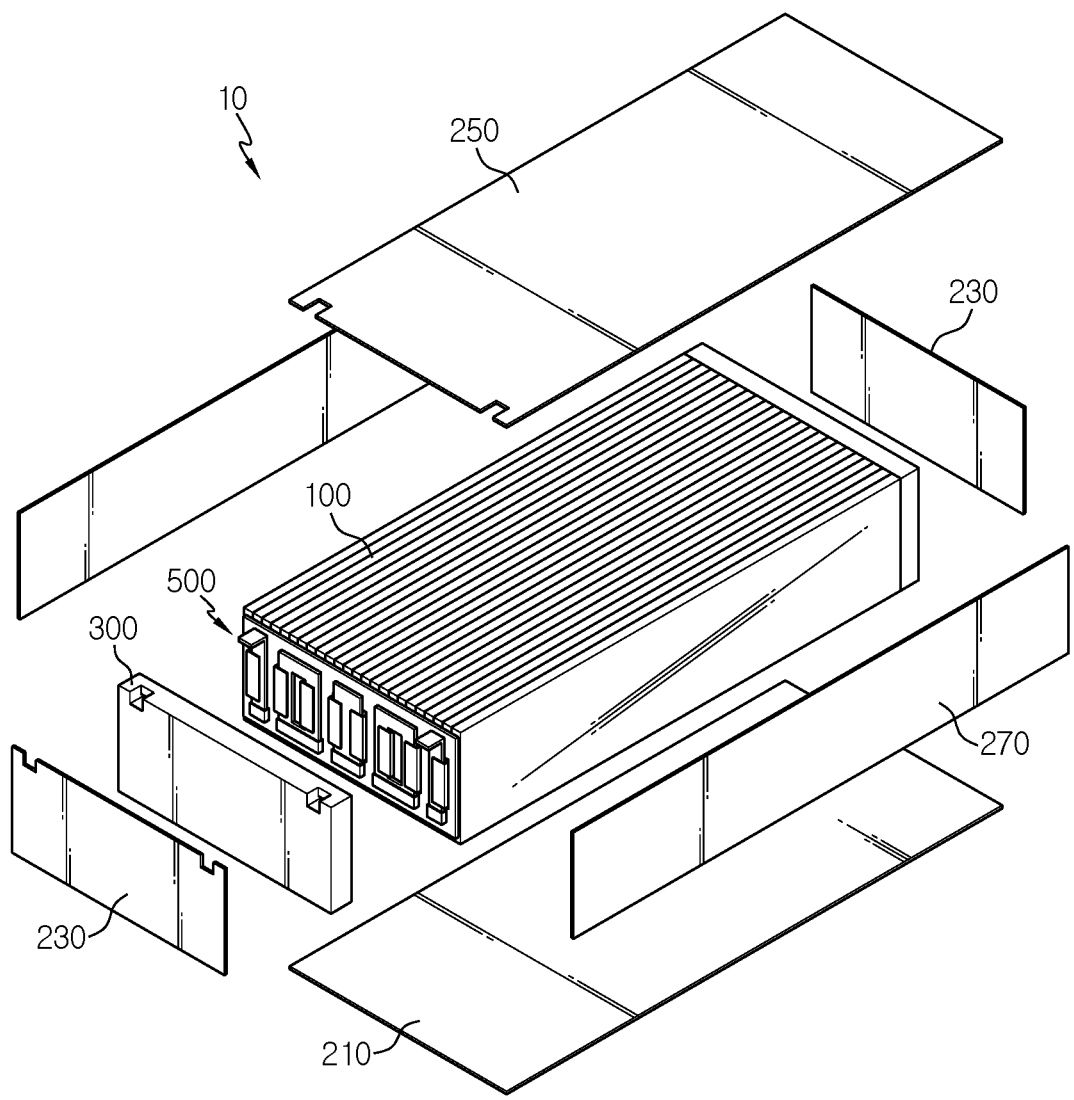
FIG. 2 is an exploded perspective view showing the battery module of FIG. 1.
Figure 3:
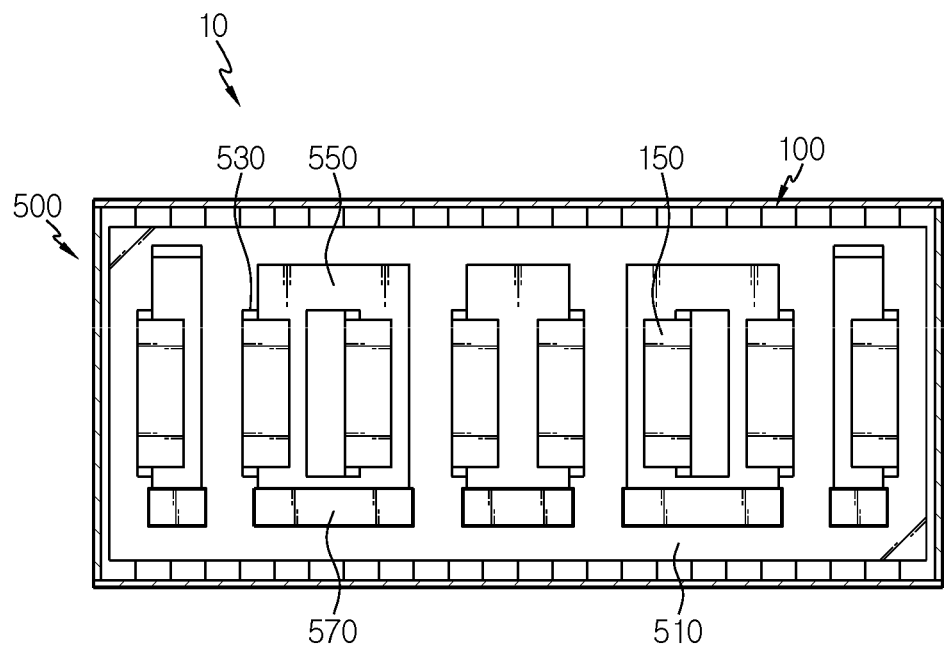
FIG. 3 is a diagram for illustrating a bus bar assembly of the battery module of FIG. 1.
Figure 4:
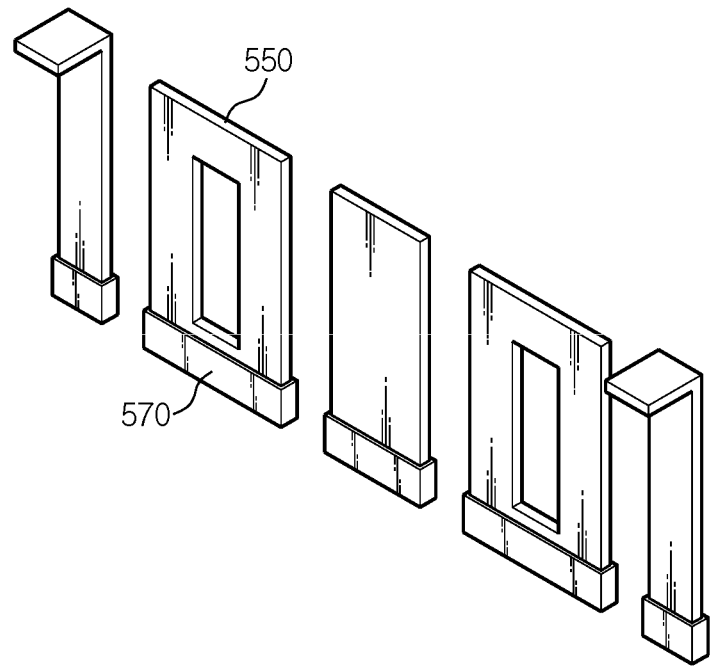
FIGS. 4 and 5 are diagrams for illustrating a main part of the bus bar assembly of FIG. 3.
Figure 5:
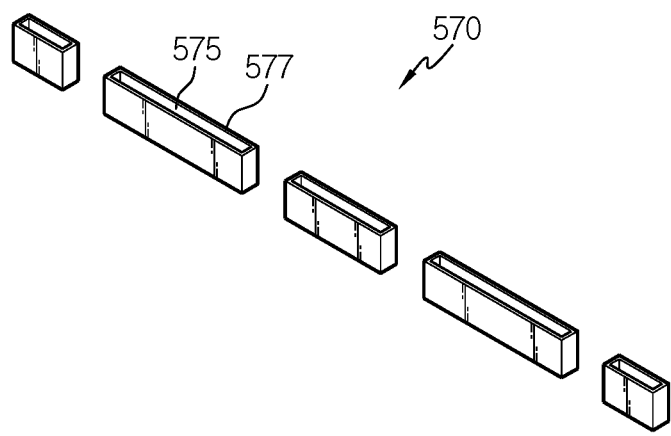

FIG. 1 is a diagram for illustrating a battery module according to an embodiment of the present disclosure, FIG. 2 is an exploded perspective view showing the battery module of FIG. 1, FIG. 3 is a diagram for illustrating a bus bar assembly of the battery module of FIG. 1, and FIGS. 4 and 5 are diagrams for illustrating a main part of the bus bar assembly of FIG. 3.

Referring to FIGS. 1 to 5, the battery module 10 may include a battery cell 100, a module case 200, an insulation cover 300, and a bus bar assembly 500.

The battery cell 100 is a secondary battery and may be a pouch-type secondary battery, a rectangular secondary battery or a cylindrical secondary battery. Hereinafter, in this embodiment, it will be described that the battery cell 100 is a pouch-type secondary battery.

There may be a plurality of battery cells 100, and the plurality of battery cells 100 may be electrically connected to each other. Each of the plurality of battery cells 100 may include a pair of electrode leads 150.

The pair of electrode leads 150 may be provided at both ends of the battery cell 100. The pair of electrode leads 150 may be electrically connected to each other through a bus bar assembly 300, as explained below in greater detail.

The module case 200 may accommodate the plurality of battery cells 100. To this end, the module case 200 may have an accommodation space for accommodating the plurality of battery cells 100.

The module case 200 may include a base plate 210, an end plate 230, a top plate 250, and a side plate 270.

The base plate 210 forms the bottom of the module case 200 and may support the plurality of battery cells 100. To this end, the base plate 210 may have an area capable of supporting a lower portion of the plurality of battery cells 100.

The end plate 230 forms front and rear sides of the module case 200 and may be provided in a pair. The end plate 230 may be coupled with the base plate 210.

The top plate 250 forms an upper portion of the module case 200 and may cover an upper side of the plurality of battery cells 100. The top plate 250 may be coupled with at least one of the pair of end plates 230 and the pair of side plates 270, as explained below in greater detail.

The side plate 270 forms both sides of the module case 200 and may be provided in a pair. The side plate 270 may be coupled with the base plate 210, the pair of end plates 230, and the top plate 250.

The insulation cover 300 may be disposed between the pair of end plates 230 and the bus bar assembly 500, as explained below in greater detail. In addition to the insulation function, the insulation cover 300 may also serve to buffer an impact of the plurality of battery cells 100 from an external impact.

The bus bar assembly 500 is provided inside the module case 200 and may be electrically connected to the electrode leads 150 of the plurality of battery cells 100. The bus bar assembly 500 may sense the voltage of the plurality of battery cells 100.

The bus bar assembly 500 may include a bus bar frame 510, a lead slot 530, a sensing bus bar 550, and a short-circuit prevention member 570.

The bus bar frame 510 may be disposed on at least one side of the plurality of battery cells 100. Specifically, the bus bar frame 510 may be disposed on at least one of the front and rear sides of the plurality of battery cells 100.

The lead slot 530 is provided in the bus bar frame 510 and there may be a plurality of lead slots 530. Each of the plurality of lead slots 530 may allow each of the electrode leads 150 of each of the plurality of battery cells 100 to pass therethrough along a front and rear direction of the bus bar frame 510.

There may be a plurality of sensing bus bars 550. Each of the plurality of sensing bus bars 550 are disposed to face each of the plurality of lead slots 530 and may be connected to each of the electrode leads 150 of each of the plurality of battery cells 100 passing through each of the plurality of lead slots 530.

There may be a plurality of short-circuit prevention members 570. Each of the plurality of short-circuit prevention members 570 are mounted to at least one end of each the plurality of sensing bus bars 550 and may surround the at least one end of each of the plurality of sensing bus bars 550.

The plurality of short-circuit prevention members 570 may include an insulating material to prevent the plurality of sensing bus bars 550 from being short-circuited when a predetermined condensed water is filled inside the module case 200 due to dew condensation.

Specifically, the plurality of short-circuit prevention members 570 may be made of a rubber material. Meanwhile, the plurality of short-circuit prevention members 570 may be insulation-coated to surround the lower end of each sensing bus bar 550.

The plurality of short-circuit prevention members 570 may be mounted at the lower ends of the plurality of sensing bus bars 550. More specifically, each of the plurality of short-circuit prevention members 570 may have a short-circuit prevention groove 575 capable of accommodating the lower end of each sensing bus bar 550.

The short-circuit prevention groove 575 may have a shape corresponding to the lower end of each sensing bus bar 550. The short-circuit prevention groove 575 may have an opening 577 formed at an upper end thereof so that the lower end of each sensing bus bar 550 may be inserted therein.

Hereinafter, a mechanism for preventing the sensing bus bar 550 from being short-circuited through the short-circuit prevention member 570 when dew condensation occurs according to this embodiment will be described in more detail.

Figure 6:
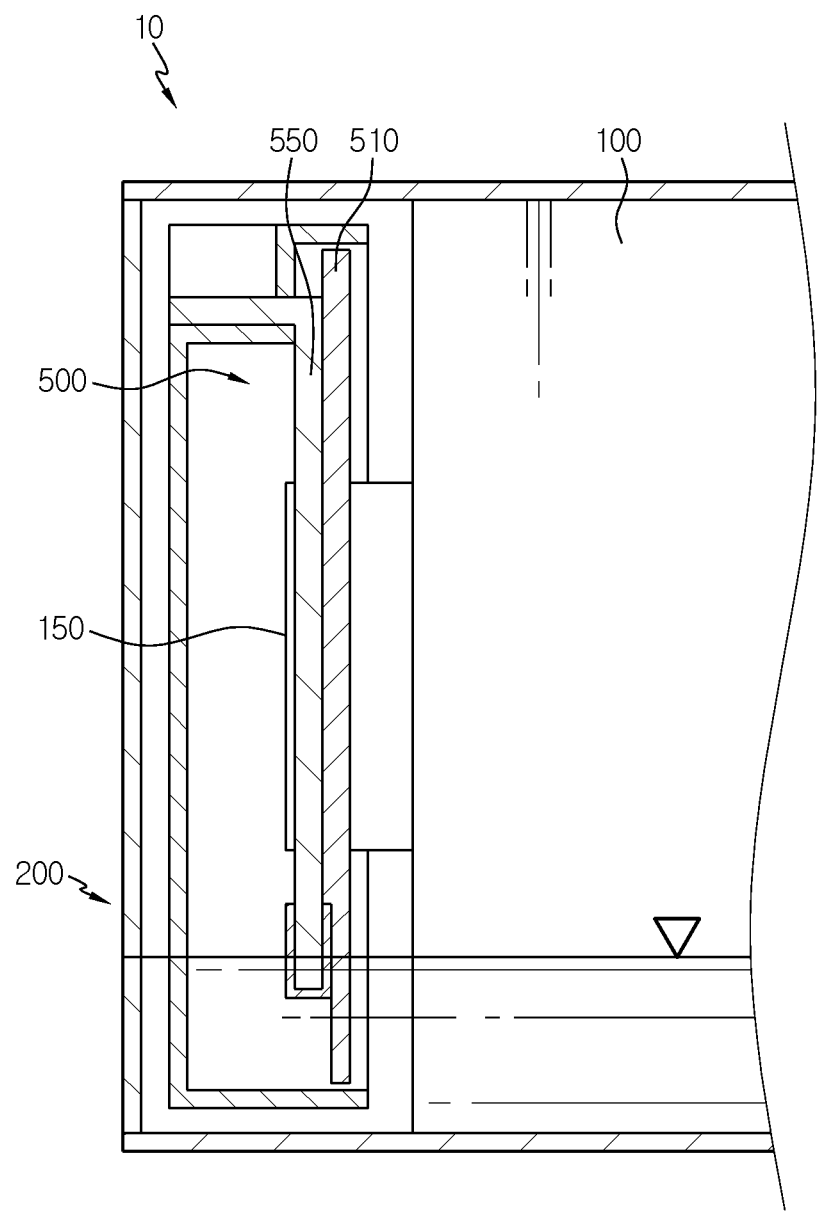
FIGS. 6 and 7 are diagrams for illustrating a process of preventing sensing bus bars from being short-circuited when dew condensation occurs in the battery module of FIG. 1.
Figure 7:
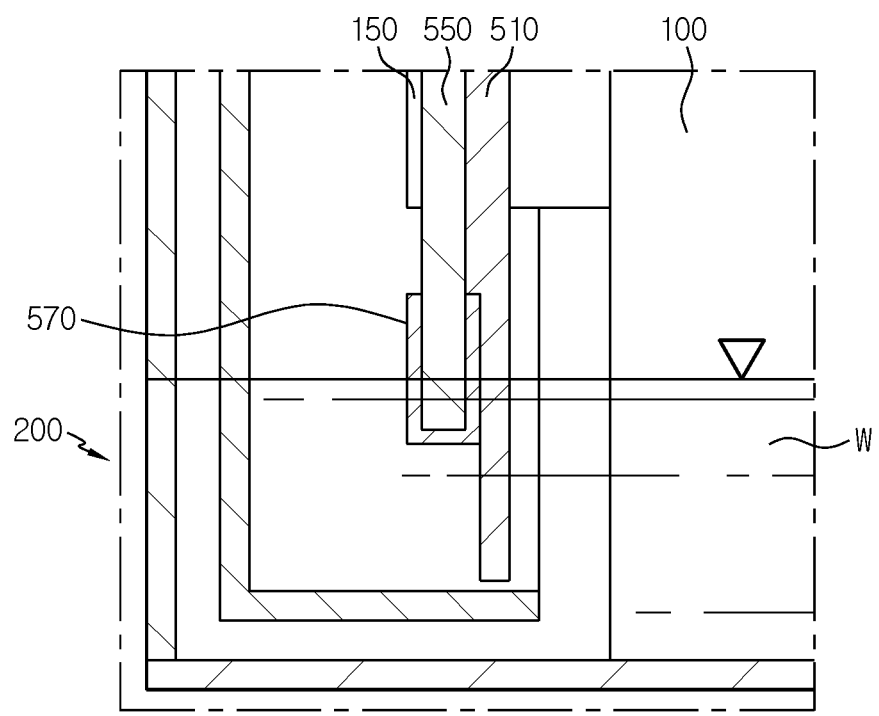

FIGS. 6 and 7 are diagrams for illustrating a process of preventing sensing bus bars from being short-circuited when dew condensation occurs in the battery module of FIG. 1.

Referring to FIGS. 6 and 7, if the battery module 10 is exposed to environmental changes such as temperature change, dew condensation may occur inside the battery module 10. Due to the dew condensation phenomenon, as the internal water vapor rises, the condensed water W may be filled to a predetermined height inside the module case 200 of the battery module 10.

At this time, since the short-circuit prevention member 570 according to this embodiment made of an insulating material surrounds the lower end of the sensing bus bar 550, it is possible to effectively prevent the sensing bus bar 550 from being short-circuited due to the condensed water W. In addition, the risk of short-circuit between the electrode leads 150 may also be effectively reduced.

Figure 8:
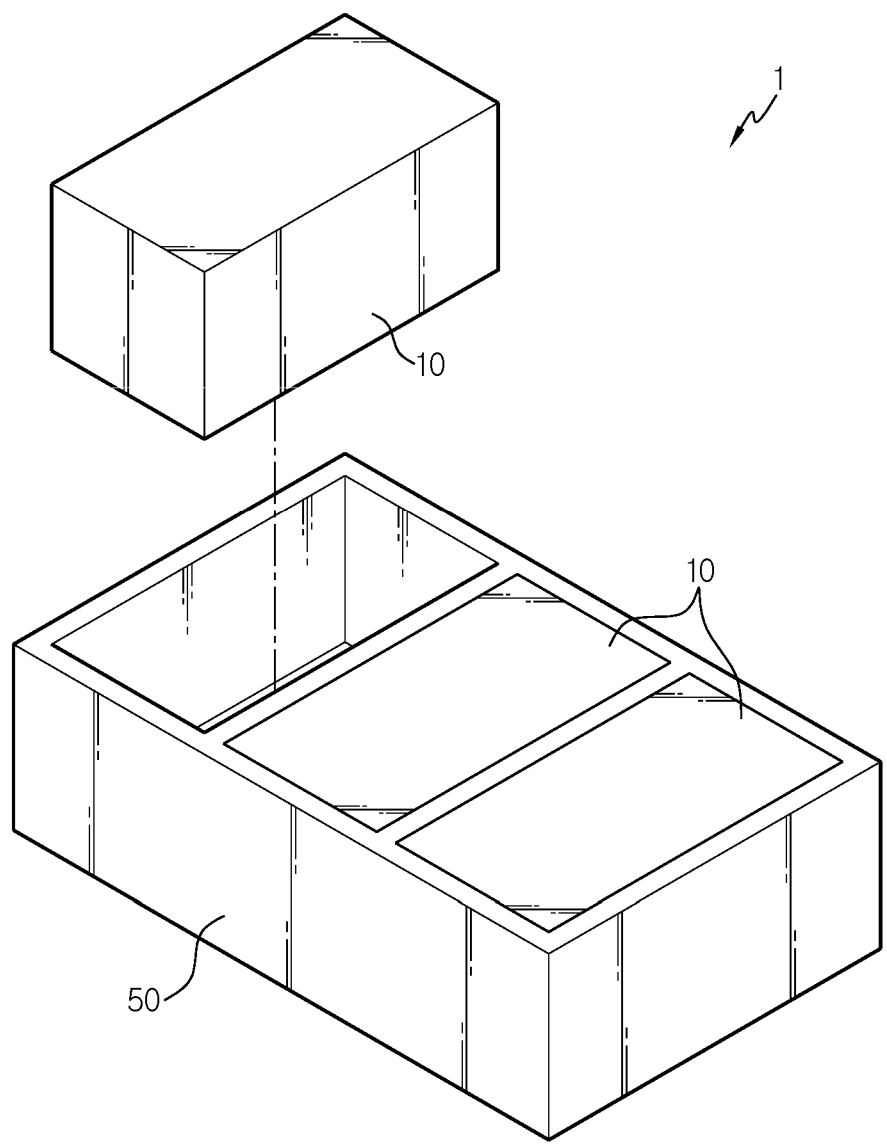
FIG. 8 is a diagram for illustrating a battery pack according to an embodiment of the present disclosure.
Figure 9:
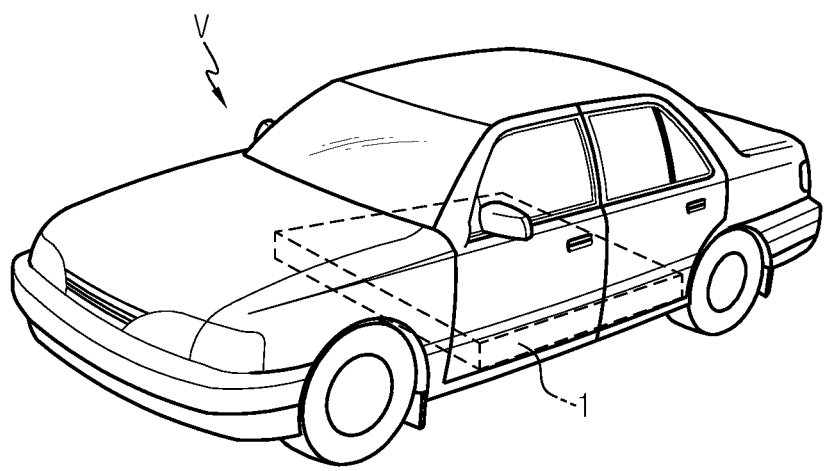
FIG. 9 is a diagram for illustrating a vehicle according to an embodiment of the present disclosure.

FIG. 8 is a diagram for illustrating a battery pack according to an embodiment of the present disclosure, and FIG. 9 is a diagram for illustrating a vehicle according to an embodiment of the present disclosure.

Referring to FIGS. 8 and 9, a battery pack 1 may include at least one battery module 10 and a pack case 50 for packaging the at least one battery module 10 according to the above-described embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as described above, it is possible to provide a battery module 10 which may prevent sensing bus bars 550 from being short-circuited when dew condensation occurs in the battery module 10, and a battery pack 1 and a vehicle V including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells;
a module case configured to accommodate the plurality of battery cells; and
a bus bar assembly positioned inside the module case and electrically connected to electrode leads of the plurality of battery cells,
wherein the bus bar assembly includes:
a bus bar frame positioned on at least one side of the plurality of battery cells;
a plurality of lead slots defined by the bus bar frame sized and shaped for the electrode leads of the plurality of battery cells to pass therethrough;
a plurality of sensing bus bars positioned to face the plurality of lead slots and connected to the electrode leads of the plurality of battery cells; and
a plurality of short-circuit prevention members coupled to at least one end of each of the plurality of sensing bus bars and configured to surround the at least one end of each of the plurality of sensing bus bars.

2. The battery module according to claim 1,
wherein the plurality of short-circuit prevention members are coupled to lower ends of the plurality of sensing bus bars.

3. The battery module according to claim 2,
wherein the plurality of short-circuit prevention members define a short-circuit prevention groove formed to accommodate the lower end of each sensing bus bar.

4. The battery module according to claim 3,
wherein the short-circuit prevention groove has a shape corresponding to the lower end of each sensing bus bar.

5. The battery module according to claim 3,
wherein the short-circuit prevention groove has an opening formed at an upper end thereof so that the lower end of each sensing bus bar is adapted to be inserted therein.

6. The battery module according to claim 2,
wherein the plurality of short-circuit prevention members are insulation-coated to surround the lower end of each sensing bus bar.

7. The battery module according to claim 1,
wherein the plurality of short-circuit prevention members include an insulating material.

8. The battery module according to claim 7,
wherein the plurality of short-circuit prevention members are made of a rubber material.

9. A battery pack, comprising:
at least one battery module as defined in claim 1; and
a pack case configured to package the at least one battery module.

10. A vehicle, comprising:
at least one battery pack as defined in claim 9.

* * * * *